United States Patent
Williams (10) Patent No.: US 9,157,553 B1
(45) Date of Patent: Oct. 13, 2015

(54) PIPELINE REPAIR APPARATUS AND METHOD

(71) Applicant: Vyvyan G. Williams, Vankleek Hill (CA)

(72) Inventor: Vyvyan G. Williams, Vankleek Hill (CA)

(*) Notice: Subject to any disclaimer, the term of this patent is extended or adjusted under 35 U.S.C. 154(b) by 0 days.

(21) Appl. No.: 14/680,646

(22) Filed: Apr. 7, 2015

(51) Int. Cl.
| | | |
|---|---|---|
| *F16L 55/18* | (2006.01) | |
| *F16L 1/26* | (2006.01) | |
| *F16L 19/00* | (2006.01) | |
| *F16L 57/00* | (2006.01) | |

(52) U.S. Cl.
CPC . *F16L 1/26* (2013.01); *F16L 19/00* (2013.01); *F16L 57/00* (2013.01)

(58) Field of Classification Search
USPC .................................. 405/184.1, 184.2, 158; 137/15.09–15.14, 318; 138/99
See application file for complete search history.

(56) References Cited

U.S. PATENT DOCUMENTS

| 2,404,936 | A | 7/1946 | Wills |
|---|---|---|---|
| 4,458,721 | A | 7/1984 | Yie et al. |
| 5,190,180 | A | 3/1993 | Crone |
| 5,285,806 | A | 2/1994 | Ortega |
| 5,456,047 | A * | 10/1995 | Dorka ........................ 52/167.4 |
| 5,511,573 | A | 4/1996 | Corte |
| 5,778,919 | A | 7/1998 | Petrone |
| 6,899,138 | B2 | 5/2005 | Lundman |
| 8,628,275 | B1 * | 1/2014 | Trader et al. .................. 405/216 |
| 8,720,490 | B1 | 5/2014 | Burns |
| 8,820,409 | B2 | 9/2014 | Lacy |
| 2011/0307105 | A1 | 12/2011 | Commoner |
| 2012/0006559 | A1 | 1/2012 | Brite |
| 2012/0160509 | A1 | 6/2012 | Caldwell et al. |
| 2013/0279988 | A1 | 10/2013 | Al-Buraik |
| 2014/0182859 | A1 | 7/2014 | Deslierres et al. |

* cited by examiner

*Primary Examiner* — Sean Andrish
(74) *Attorney, Agent, or Firm* — Dale J. Ream (57) ABSTRACT

A pipeline repair apparatus for use with a pipe having a rupture includes a clamp member having a hemispherical first portion complementary to a hemispherical second portion being pivotally coupled to the first portion. The second portion is pivotally movable between an open configuration allowing the clamp member to be removed from the ruptured pipe and a closed configuration preventing the clamp member from being removed from the ruptured pipe. The clamp member defines an open top and bottom through which the ruptured pipe extends when the first portion and the second portion are attached thereto. The first portion and the second portion define a plurality of first portion apertures and second portion apertures, respectively, each first portion aperture being aligned in association with a second portion aperture. The apparatus includes a plurality of drill insertion rods, each rod having a configuration selectively received through first and second portion apertures.

18 Claims, 7 Drawing Sheets

PIPELINE REPAIR APPARATUS AND METHOD

BACKGROUND OF THE INVENTION

This invention relates generally to devices for reducing, repairing, containing, or limiting the unintended flow of fluid from an undersea or underground pipe. More particularly, the present invention relates to a pipeline repair apparatus and method of using the apparatus to stepwise block the flow of a fluid, such as oil, flowing from a ruptured pipe until the flow is stopped altogether.

A ruptured oil pipeline submerged in the ocean can result in catastrophic leakage of oil into the ocean which causes an enormous loss of sea life and other environmental consequences. The extreme depth of the pipe in need of repair makes it difficult to move the needed equipment to the location of the spill and to move human personnel into position to carry out the repair procedures. In addition, the strong pressurized outflow from a rupture is difficult to patch in a permanent manner.

Various devices and methods have been proposed in the prior art for controlling the outflow of fluid from a submerged ruptured pipe, such as with valves, sleeves, or other patches. Although presumably effective for their intended purposes, the existing proposals do not provide an apparatus that can be deployed to incrementally block the flow of fluid from a ruptured pipe.

Therefore, it would be desirable to have a pipeline repair apparatus that includes first and second clamp portions selectively positioned about the ruptured area of a pipeline but that allow leaking fluid to initially continue flowing. Further, it would be desirable to have a pipeline repair apparatus in which the clamp portions define corresponding apertures configured to receive respective drill insertion rods across the area being affected by the leaking fluid. In addition, it would be desirable to have a pipeline repair apparatus in which each drill insertion rod is configured to further block flowing fluid when it is rotated.

SUMMARY OF THE INVENTION

A pipeline repair apparatus according to the present invention for use with a generally cylindrical pipe having a rupture includes a clamp member that includes a first portion having a generally hemispherical configuration that is complementary to a configuration of the ruptured pipe and a second portion having a generally hemispherical configuration and being pivotally coupled to the first portion. The second portion is pivotally movable between an open configuration allowing the clamp member to be removed from the ruptured pipe and a closed configuration preventing the clamp member from being removed from the ruptured pipe. The clamp member defines an open top and an opposed open bottom through which the ruptured pipe extends when the first portion and the second portion are attached thereto. The first portion and the second portion define a plurality of first portion apertures and second portion apertures, respectively, each first portion aperture being aligned in association with a second portion aperture. The apparatus includes a plurality of drill insertion rods, each drill insertion rod having a configuration selectively received through respective associated first portion and second portion apertures.

Therefore, a general object of this invention is to provide a pipeline repair apparatus that, when coupled to a ruptured pipe, can be configured to incrementally reduce or eliminate leakage from the pipe.

Another object of this invention is to provide a pipeline repair apparatus, as aforesaid, that includes corresponding apertures configured to receive respective drill insertion rods across the area being affected by the leaking fluid.

Still another object of this invention is to provide a pipeline repair apparatus, as aforesaid, in which each drill insertion rod is configured to further block flowing fluid when it is rotated.

Yet another object of this invention is to provide a pipeline repair apparatus, as aforesaid, that enables rocks or cement to be inserted into the area where leaking fluid is being blocked.

A further object of this invention is to provide a pipeline repair apparatus, as aforesaid, that may be utilized at a large depth below a water surface with little or no need for human presence.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a section view of the apparatus for repairing pipeline taken along line 3b-3b of FIG. 3a.

FIG. 4b is a section view of the apparatus for repairing pipeline taken along line 4b-4b of FIG. 4a.

DESCRIPTION OF THE PREFERRED EMBODIMENT

An apparatus and method for repair a pipeline will now be described with reference to FIGS. 1a to 4e of the accompanying drawings. The apparatus 100 generally includes a clamp member 105 and a plurality of drill insertion rods 140 configured to aid in stopping or inhibiting the flow of liquid or gas (fluid) through a rupture in a pipe 200.

Figure 1A:
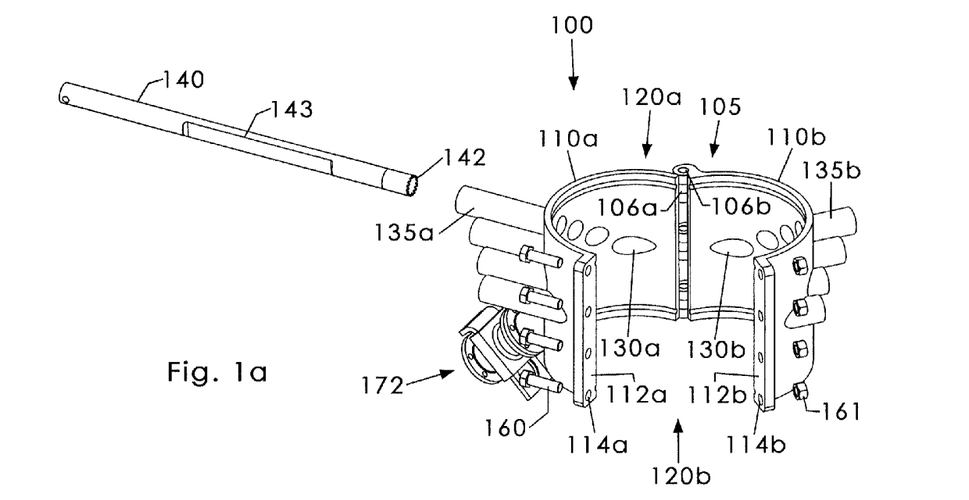
FIG. 1a is a perspective view of an apparatus for repairing a pipeline according to a preferred embodiment of the present invention illustrated in an open position.
Figure 1B:
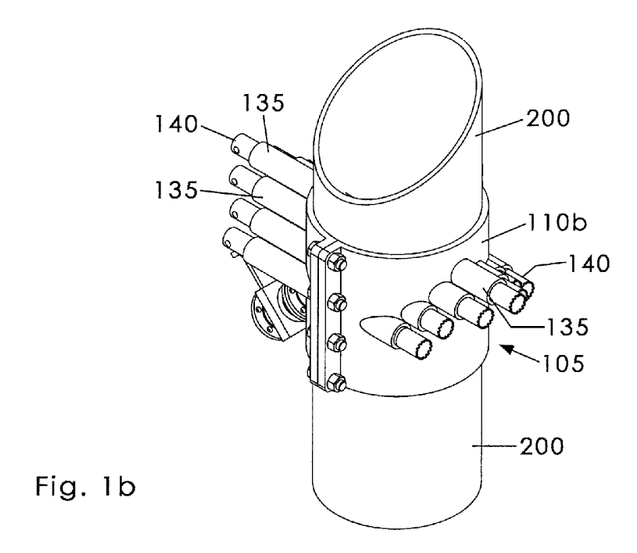
FIG. 1b is a perspective view of the apparatus of FIG. 1a shown in a closed position.

With reference to FIGS. 1a and 1b, the clamp member 105 comprises a first portion 110a and a second portion 110b. The clamp member portions 110a, 110b may have generally opposing hemispherical configurations such that, when coupled together, the clamp member 105 may be complementary to a configuration of the pipe 200. It shall be understood that the clamp member 105 may be sized based on the diameter of the pipe 200.

The clamp member first portion 110a may be pivotally connected to the clamp member second portion 110b at corresponding hinges 106a, 106b, such as by a pin. Planar surface flanges 112a, 112b may extend from the first portion 110a and the second portion 110b, respectively, at edges opposite the hinges 106a, 106b. Each surface flange 112a, 112b may be equipped with corresponding openings 114a, 114b for receiving a mechanical fastener, for example, a bolt 160 which is secured into place via nut 161. In a closed position, the clamp member 105 defines an open top 120a and an opposed open bottom 120b through which the ruptured pipe 200 extends.

Figure 2C:
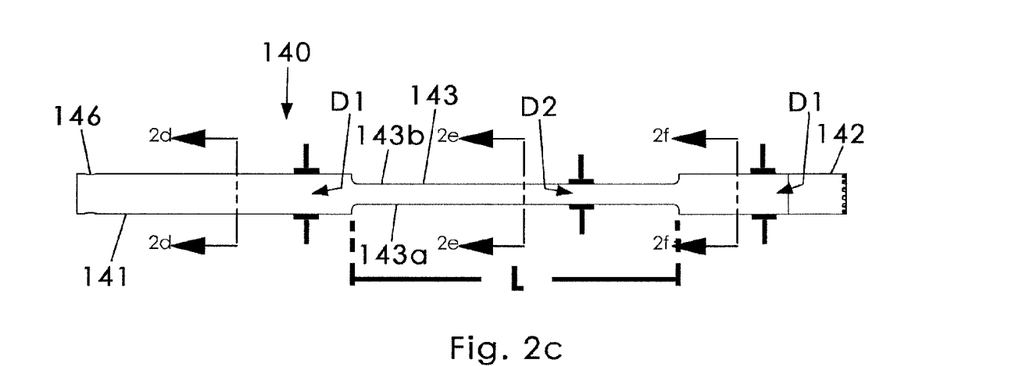
FIG. 2c is a top view of the drill insertion rod of FIG. 2c.
Figure 2D:
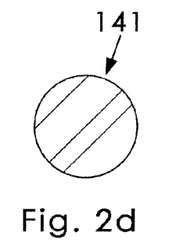
FIG. 2d is a section view of the drill insertion rod taken along line 2d-2d of FIG. 2c.
Figure 2E:
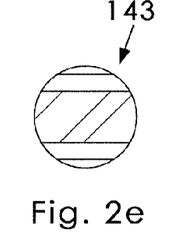
FIG. 2e is a section view of the drill insertion rod taken along line 2e-2e of FIG. 2c.
Figure 2F:
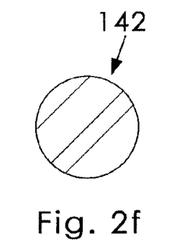
FIG. 2f is a section view of the drill insertion rod taken along line 2f-2f of FIG. 2c.
Figure 2G:
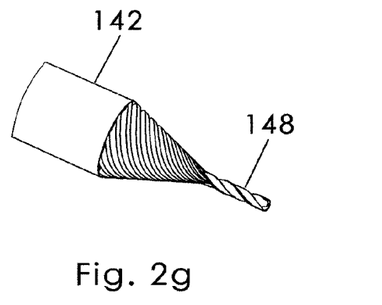
FIG. 2g is an isolated view on an enlarged scale of an alternative embodiment of the end of the drill insertion rod of FIG. 2a showing a pointed configuration with elongated tip.
Figure 3A:
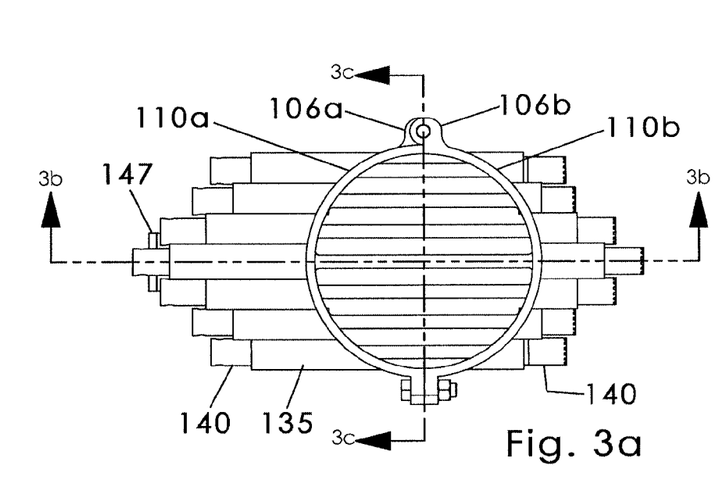
FIG. 3a is a top view of an apparatus for repairing pipeline in a closed position around a pipe having drill insertion rods inserted therethrough and rotated into an open position, according to an embodiment of the present invention.
Figure 3B:
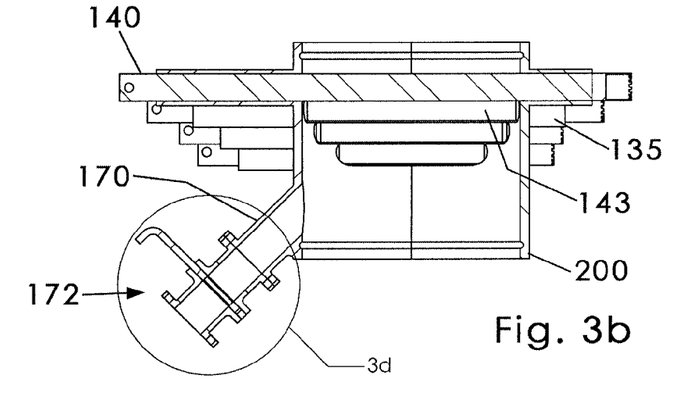
Figure 3C:
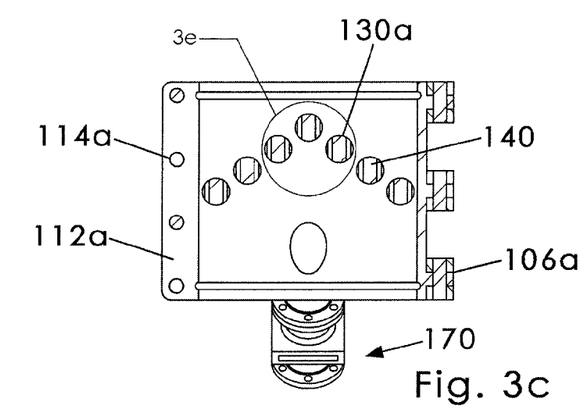
FIG. 3c is a section view of the apparatus for repairing pipeline taken along line 3c-3c of FIG. 3a and showing the drill insertion rods in the open position.
Figure 3D:
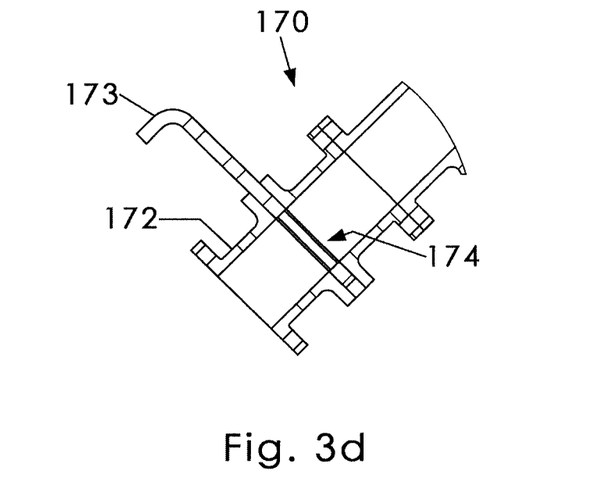
FIG. 3d is an isolated view on an enlarged scale of a gate valve taken from FIG. 3b illustrated in an open position.
Figure 4A:
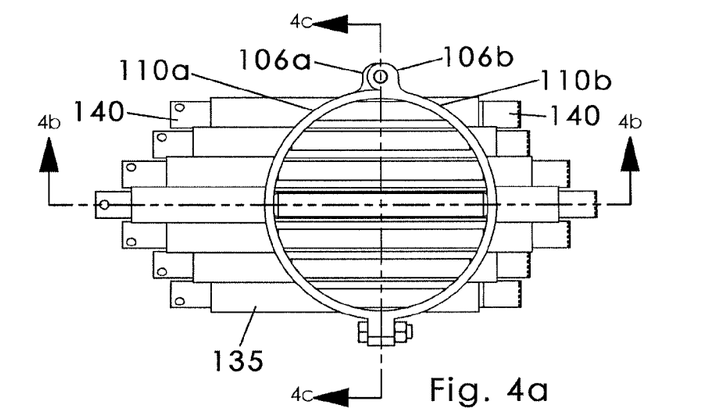
FIG. 4a is a top view of an apparatus for repairing pipeline in a closed position around a pipe having drill insertion rods inserted therethrough and rotated into a closed position, according to an embodiment of the present invention.
Figure 4B:
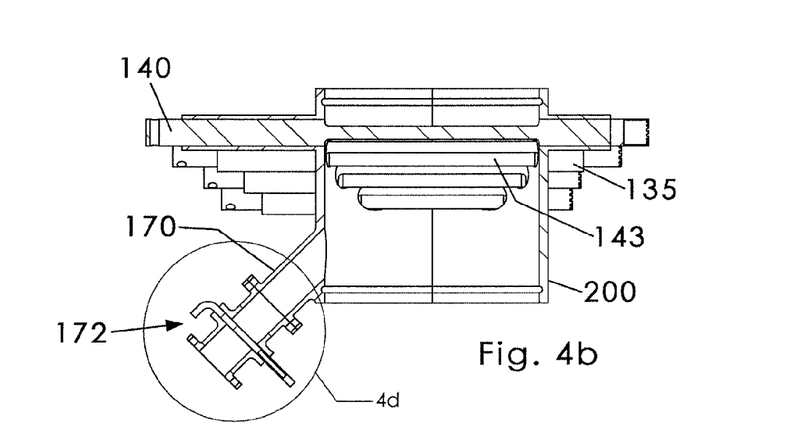
Figure 4C:
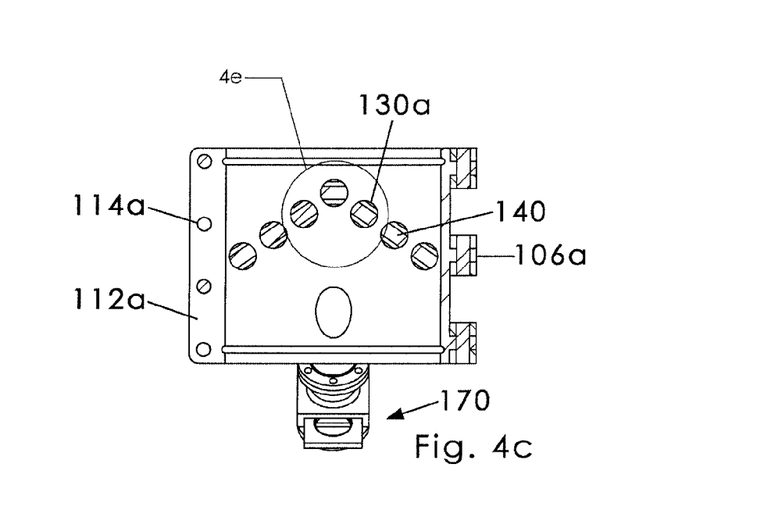
FIG. 4c is a section view of the apparatus for repairing pipeline taken along line 4c-4c of FIG. 4a and showing the drill insertion rods in the open position.
Figure 4D:
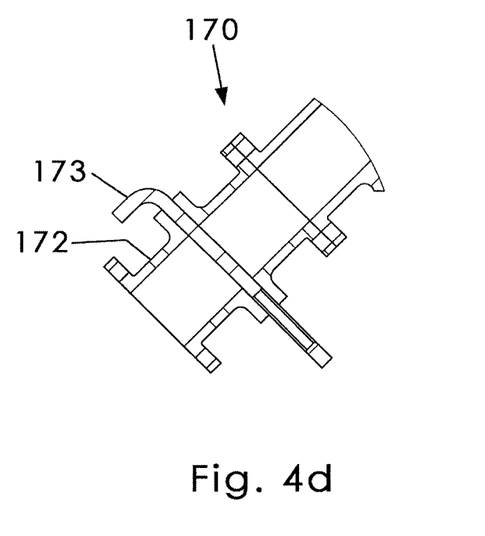
FIG. 4d is an isolated view on an enlarged scale of a gate valve taken from FIG. 4b in a closed position.

Apertures 130a in the clamp member first portion 110a correspond to apertures 130b in the clamp member second portion 110b for receiving drill insertion rods 140 therethrough. As shown in FIGS. 3c and 4c, in embodiments, the apertures 130a, 130b may be arranged on either side of the first portion 110a and second portion 110b in a triangular configuration. The triangular configuration of the apertures 130a, 130b may maximize the number of drill insertion rods 140 that can be received through the clamp member 105, thereby ensuring the greatest inhibition of flow through the ruptured pipe 200. The diameter of the apertures 130a, 130b may generally correspond to the largest diameter D1 of the drill insertion rods 140 (FIG. 2c).

Referring back to FIGS. 1a and 1b, hollow guide tubes 135a, 135b (generally 135) may extend outwardly from the apertures 130a, 130b. An inside diameter of the guide tubes 135 may correspond to the diameter of the respective aperture 130a, 130b such that a drill insertion rod 140 may be received therethrough. The guide tubes 135 may aid in the process of directing the drill insertion rod 140 through the ruptured pipe 200 as described below.

Varying lengths of guide tubes 135 may be provided, which may correspond to varying lengths of drill insertion rods 140. For example, the drill insertion rod 140 inserted through the apertures 130a, 130b at the center of the respective first and second portions 110a, 110b may be longer than the drill insertion rod 140 inserted through the apertures 130a, 130b near the hinge 106a, 106b and surface flange 114a, 114b. Accordingly, the larger the section of pipe 200 that the drill insertion rod 140 must traverse, the longer the drill insertion rod 140, and therefore, the longer the guide tube 135.

Figure 3E:
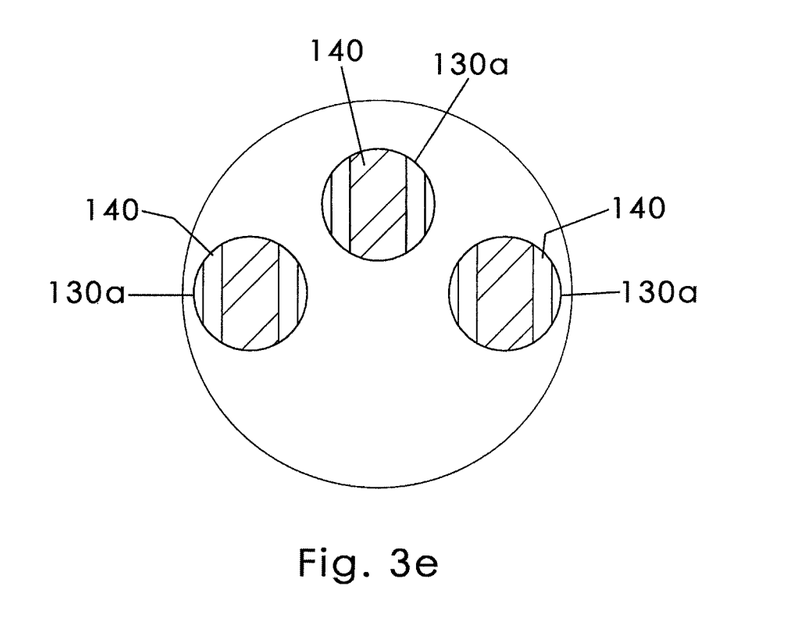
FIG. 3e is an isolated view on an enlarged scale of the drill insertion rods taken from FIG. 3c illustrated in an open position.
Figure 4E:
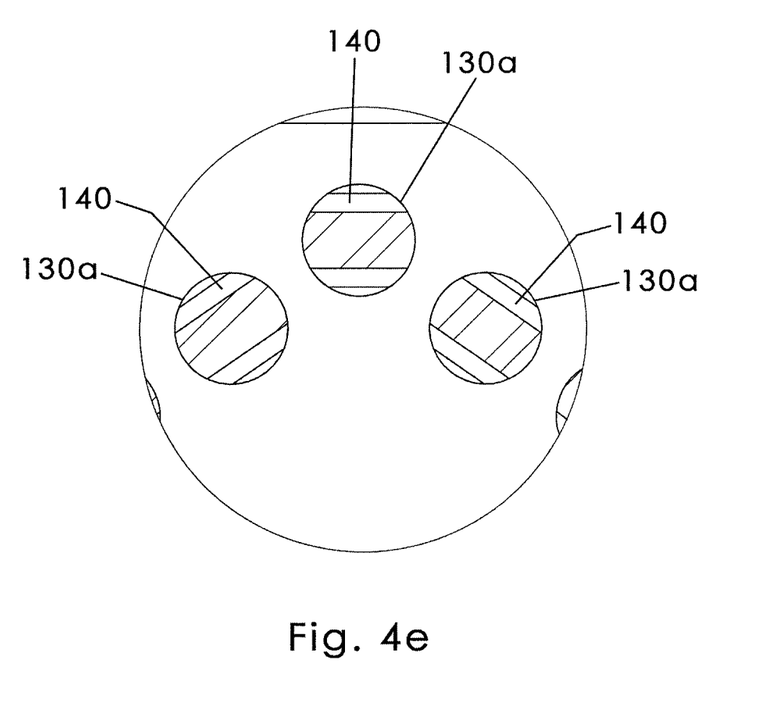
FIG. 4e is an isolated view on an enlarged scale of the drill insertion rods taken from FIG. 4c in a closed position.

Referring now to FIGS. 2a through 2f, the drill insertion rods 140 may be generally cylindrical and have a uniform diameter D1 between first and second ends 141, 142. A recessed section 143 having a depth D2 is located between the ends 141, 142 and extends a length L. The recessed section 143 may have opposing planar faces, 143a and 143b, as may be seen in FIGS. 2a and 2c. The planar faces 143a, 143b may be configured such that, when oriented in an open position (e.g., the faces 143a, 143b are vertically oriented as shown in FIG. 3e), flow proceeds through the pipe and when oriented in a closed position (e.g., the faces 143a, 143b are more generally horizontally oriented as shown in FIG. 4e), flow through the pipe 200 is more inhibited. More particularly, the diameter D1 of the drill insertion rods 140 may face a direction of fluid flow through the pipe when oriented in the closed position, and the depth D2 of the drill insertion rods 140 may face a direction of fluid flow through the pipe when oriented in the open position.

As noted above, the drill insertion rods 140 may be provided in a variety of sizes based on the diameter of the pipe 200 through which the rods 140 are inserted. The longest rod 140 may be inserted through the most centrally located apertures 130a, 130b in the clamp member 105, as the rod 140 must extend through the entire diameter of the pipe 200. As respective apertures 130a, 130b progress at an angle from either side of the most centrally located apertures 130a, 130b, the lengths of the rods 140 inserted therethrough may get progressively shorter as the rods 140 must pass through only a portion of the diameter of the pipe 200. FIGS. 3a, 3b, 4a, and 4b illustrate varying lengths of rods 140 extending through respective apertures 130a, 130b in the clamp member 105 and the pipe 200.

Figure 2A:
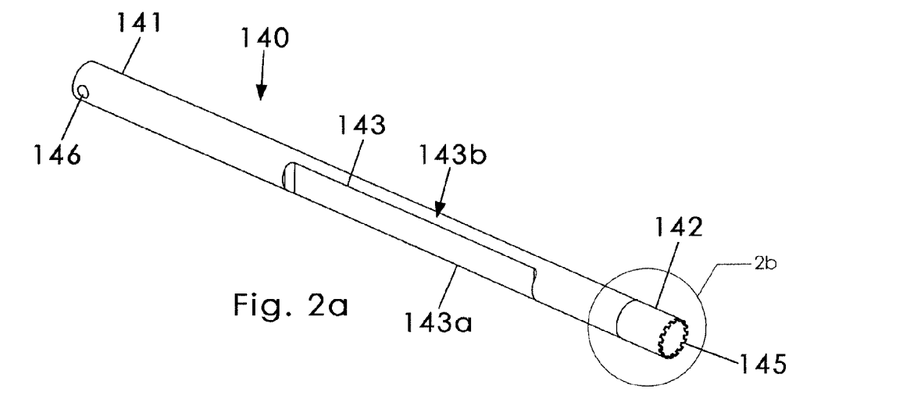
FIG. 2a is a perspective view of a drill insertion rod according to an embodiment of the present invention.
Figure 2B:
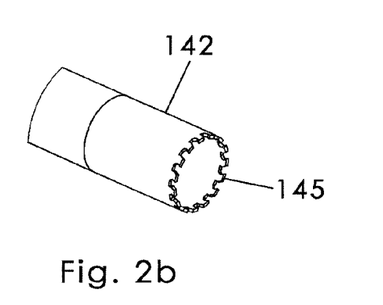
FIG. 2b is an isolated view on an enlarged scale of an end of the drill insertion rod of FIG. 2a showing teeth.

As shown in FIG. 2b, the drill insertion rod second end 142 may be enabled with teeth 145 for drilling a hole through the pipe 200 as described below regarding an exemplary method of use. A cross hole 146 in the drill insertion rod first end 141 may receive a turning bar 147 (FIG. 3a) for turning the drill insertion rod 140. The rod 140 may be formed of any material sufficient to drill through the walls of an existing pipe 200 and to inhibit the flow of fluid through the pipe 200 once the rods 140 are inserted and rotated into the closed position. In an embodiment shown in FIG. 2g, the second end 142 of a drill insertion rod 140 may have a spiral and pointed configuration having an elongated tip 148. This pointed spiral configuration may be more effective to penetrate through the wall of a pipe or other obstructions as will be described below in further detail.

Referring now to FIGS. 3d and 4d, and FIGS. 3b and 4b which give perspective thereto, the clamp member 105 may further be equipped with an accessory flange 170. The accessory flange 170 may be configured to attach to a valve 172, such as a gate valve (such as the one shown in FIGS. 3d and 4d), a pipe, et cetera. The valve 172 may alternate between an open position (FIG. 3d) in which a gate 173 is not covering an opening 174 in the valve 172 and materials can be pumped through the valve 172, and a closed position (FIG. 4d) in which the gate 173 is covering the opening 174 in the valve 172 and flow of materials through the valve 172 is prevented. The valve 172 may be configured to attach to various fixtures, for example a concrete slurry pump or an oil extraction pipe, facilitating flow of the material through the valve 172.

Mechanical fasteners, such as nut and bolt constructs for example, may be used for securing the valve 172 to the accessory flange 170 and/or other various accessories. The accessory flange 170 may extend outwardly from the first portion 110a or the second portion 110b. As shown in FIGS. 3b and 4b, the accessory flange 170 may extend from the clamp member 105 at an angle.

In one exemplary method of use, the clamp member 105 may be positioned around the pipe 200 at or near a rupture in the pipe 200 so that a portion of the clamp member 105 covers the rupture. The clamp member first portion 110a and second portion 110b are pivoted into place and the clamp 105 is securely closed around the pipe 200 via a bolt 160 received through the planar surface flanges 112a, 112b and secured with a nut 161.

If desired, a drill inserted through the accessory flange 170 may drill a hole through a near wall of the pipe 200. The drill may be, for example, a drill insertion rod 140 or any other appropriate drilling device. Once the hole corresponding to the accessory flange 170 has been drilled, a valve 172 may be mechanically fastened to the accessory flange 170 and placed in the closed position as described above.

With the clamp member 105 in place, corresponding length drill insertion rods 140 may be used to drill through the pipe 200, one rod 140 at a time. The drill insertion rod 140 may enter through the appropriate guide tube 135a and aperture 130a of the clamp member first portion 110a. Using the turning bar 146, the drill insertion rod 140 is rotated to drill holes through the pipe 200 such that the rod 140 exits the clamp member 105 through opposing aperture 130b and guide tube 135b. During placement of the drill insertion rods 140, the rods 140 may be oriented in the open position so as not to impede flow through the pipe 200. Once all of the rods 140 are placed, the rods 140 may be individually rotated into the closed position, thus gradually decreasing the amount of flow through the pipe 200. In the closed position, flow through the pipe 200 may be significantly reduced, but not completely shut off.

With the drill insertion rods 140 in place and in the closed position, the desired fixture may be attached to the accessory flange 170 and/or valve 172. For example, a slurry pump may be attached to the valve 172. When appropriate, the valve 172 may be opened and the slurry pump may pump materials around the drill insertion rods 140 to completely restrict flow through the pipe 200. Another fixture that may be useful includes, but is not limited to an oil collection pipe for relieving pressure or collecting oil from the previously ruptured pipe 200.

It is understood that while certain forms of this invention have been illustrated and described, it is not limited thereto except insofar as such limitations are included in the following claims and allowable functional equivalents thereof.

The invention claimed is:

1. A pipeline repair apparatus for use with a generally cylindrical pipe having a rupture, comprising:
   a clamp member that includes a first portion having a generally hemispherical configuration that is complementary to a configuration of the ruptured pipe and a second portion having a generally hemispherical configuration and being pivotally coupled to said first portion, said second portion being pivotally movable between an open configuration allowing said clamp member to be removed from the ruptured pipe and a closed configuration preventing said clamp member from being removed from the ruptured pipe;
   wherein said clamp member defines an open top and an opposed open bottom through which the ruptured pipe extends when said first portion and said second portion are attached thereto;
   wherein said first portion and said second portion define a plurality of first portion apertures and second portion apertures, respectively, each first portion aperture being aligned in association with a second portion aperture; and
   a plurality of drill insertion rods, each drill insertion rod having a configuration selectively received through respective associated first portion and second portion apertures;
   wherein said clamp member includes a plurality of guide tubes, a respective guide tube having an open end coupled to an outer surface of a respective first portion or a respective second portion such that said guide tube is in communication with a respective aperture, said respective guide tube extending outwardly from said outer surface and configured to receive a respective drill insertion rod therethrough;
   wherein each drill insertion rod has:
      a generally cylindrical configuration with a uniform diameter between opposed ends; and
      a recessed area between the opposed ends, the recessed area having a depth smaller than said diameter.

2. The pipeline repair apparatus as in claim 1, wherein:
   said recessed area of each drill insertion rod has two opposing planar faces configured to rotate between an open position and a closed position; and
   fluid flow through the ruptured pipe when said opposing planar faces are at said closed position is restricted compared to fluid flow through the ruptured pipe when said opposing planar faces are at said open position.

3. The pipeline apparatus as in claim 2, wherein each drill insertion rod:
   at one of said opposed ends has a cross hole for receiving a turning bar; and
   at another of said opposed ends defines a plurality of teeth for cutting through the ruptured pipe.

4. The pipeline apparatus as in claim 3, wherein each turning bar enables a respective drill insertion rod to be manually rotated to cut through the ruptured pipe, and wherein each turning bar enables a respective drill insertion rod to be manually rotated between said open position and said closed position.

5. The pipeline apparatus as in claim 4, wherein said clamp member is selectively positioned around the ruptured pipe such that said clamp member overlays the rupture in the pipe, and wherein fluid flow through the ruptured pipe initially flows through said first portion apertures of said clamp member and said second portion apertures of said clamp member when said clamp member is initially positioned around the ruptured pipe.

6. The pipeline apparatus as in claim 5, wherein:
   said clamp member first portion has a surface flange with an opening therein;
   said clamp member second portion has a surface flange with an opening therein, said second portion surface flange being configured to align with said first portion surface flange when said second portion is at said closed configuration, said second portion surface flange opening being configured to align with said first portion surface flange opening when said second portion is at said closed configuration;
   said first portion surface flange opening and said second portion surface flange opening are collectively configured to receive a fastening member for maintaining said second portion at said closed configuration.

7. The pipeline apparatus as in claim 6, further comprising an accessory flange extending outwardly from said outer surface of said clamp member first portion or said clamp member second portion, said accessory flange not interfering with said first portion apertures, said accessory flange not interfering with said second portion apertures.

8. The pipeline apparatus as in claim 7, further comprising a gate valve securely attached to said accessory flange, said gate valve being configured to move between an open position and a closed position.

9. The pipeline apparatus as in claim 8, wherein said first portion apertures and second portion apertures are each arranged in a triangular pattern such that a corresponding first portion aperture and second portion aperture are centrally located toward said clamp member open top.

10. The pipeline apparatus as in claim 9, wherein:
said drill insertion rods have lengths that vary from one another;
a longest drill insertion rod is inserted through said centrally located first portion aperture and corresponding second portion aperture; and
progressively shorter drill insertion rods are inserted through said first portion apertures and second portion apertures.

11. The pipeline apparatus as in claim 10, wherein, when said drill insertion rods are positioned such that said recessed areas are inside the ruptured pipe and rotated to said closed position, fluid flow through the ruptured pipe is preventable by inserting material through said gate valve and allowing the material to solidify around said drill insertion rods.

12. The pipeline apparatus as in claim 10, further comprising an oil extraction pipe securely attached to said gate valve such that, when said gate valve is at said open position and said drill insertion rods are positioned such that said recessed areas are inside the ruptured pipe and rotated to said closed position, fluid from a section of the pipe below said drill insertion rods flows through said oil extraction pipe.

13. The pipeline apparatus as in claim 2, wherein each drill insertion rod:
at one of said opposed ends has a cross hole for receiving a turning bar; and
at another of said opposed ends includes a spiral and pointed configuration having an elongate tip for cutting through the ruptured pipe.

14. A method for inhibiting flow through a ruptured pipe, comprising:
locating a rupture in a pipe;
securing a clamp member around said rupture in said pipe, said clamp member comprising:
a first portion having a generally hemispherical configuration complementary to a configuration of said pipe;
a second portion having a generally hemispherical configuration complementary to a configuration of said pipe, said second portion being pivotally coupled to said first portion for movement between an open configuration allowing said clamp member to be removed from said pipe and a closed configuration preventing said clamp member from being removed from said pipe;
wherein said first portion and said second portion respectively define a plurality of first portion apertures and second portion apertures, each first portion aperture being aligned with a second portion aperture;
a plurality of guide tubes, a respective guide tube having an open end coupled to an outer surface of a respective first portion or a respective second portion such that said guide tube is in communication with a respective aperture, said respective guide tube extending outwardly from said outer surface and configured to receive a respective drill insertion rod therethrough;
providing a plurality of drill insertion rods, each drill insertion rod having:
at least one end having a plurality of teeth;
a generally cylindrical configuration with a uniform diameter between opposed ends; and
a recessed area between the opposed ends, the recessed area having a depth smaller than said diameter;
inserting each drill insertion rod through a respective clamp member first portion aperture;
drilling through said pipe using said teeth;
passing each drill insertion rod through a respective clamp member second portion aperture; and
subsequently rotating each drill insertion rod to the closed position, thus inhibiting fluid flow through said pipe.

15. The method of claim 14, further comprising:
drilling a hole in said pipe through an accessory flange extending from at least one of said first portion and said second portion;
securing a gate valve to said accessory flange;
after rotating each drill insertion rod to said closed position, opening said gate valve; and
pumping a material through said gate valve and around said drill insertion rods to prevent fluid flow through said rupture.

16. The method of claim 14, further comprising:
drilling a hole in said pipe through an accessory flange extending from at least one of said first portion and said second portion;
securing a gate valve to said accessory flange;
securing an extraction pipe to said gate valve;
after rotating each drill insertion rod to said closed position, opening said gate valve; and
allowing fluid flow through said extraction pipe.

17. The method of claim 14, further comprising: passing a respective drill rod through each guide tube.

18. The method of claim 17, wherein:
rotating each drill insertion rod to the closed position causes the diameter of each drill insertion rod to face a direction of fluid flow through said pipe; and
rotating each drill insertion rod to the open position causes the depth of each drill insertion rod to face a direction of fluid flow through said pipe.

* * * * *